United States Patent
Peter

(10) Patent No.: US 10,922,149 B2
(45) Date of Patent: Feb. 16, 2021

(54) SYSTEM COMPRISING A PLURALITY OF VIRTUALIZATION SYSTEMS

(71) Applicant: OpenSynergy GmbH, Berlin (DE)

(72) Inventor: Michael Peter, Berlin (DE)

(73) Assignee: OPENSYNERGY GMBH, Berlin (DE)

( * ) Notice: Subject to any disclaimer, the term of this patent is extended or adjusted under 35 U.S.C. 154(b) by 0 days.

(21) Appl. No.: 16/466,637

(22) PCT Filed: Dec. 19, 2017

(86) PCT No.: PCT/EP2017/083532
§ 371 (c)(1),
(2) Date: Jun. 4, 2019

(87) PCT Pub. No.: WO2018/114944
PCT Pub. Date: Jun. 28, 2018

(65) Prior Publication Data
US 2019/0303214 A1 Oct. 3, 2019

(30) Foreign Application Priority Data
Dec. 19, 2016 (EP) ..................................... 16205067

(51) Int. Cl.
*G06F 9/54* (2006.01)
*G06F 9/455* (2018.01)

(52) U.S. Cl.
CPC .......... *G06F 9/541* (2013.01); *G06F 9/45541* (2013.01)

(58) Field of Classification Search
None
See application file for complete search history.

(56) References Cited

U.S. PATENT DOCUMENTS

2015/0249712 A1   9/2015   Biondi et al.

FOREIGN PATENT DOCUMENTS

| EP | 3049992 A1 | 8/2016 |
|----|-----------|--------|
| WO | 2015047789 A1 | 4/2015 |

(Continued)

OTHER PUBLICATIONS

Stefanov, T. et. al., "System Design Using Khan Process Networks: The Compaan/Laura Approach," Design, Automation and Test in Europe Conference and Exhibition, Piscataway, NJ, USA, Feb. 16, 2004, pp. 340-345.

(Continued)

*Primary Examiner* — Syed A Roni
(74) *Attorney, Agent, or Firm* — Soquel Group LLC

(57) ABSTRACT

A system including a processor with a plurality of cores having the same instruction set architecture, at least one memory connected to the processor, a plurality of virtualization systems adapted to run respectively on one core, the plurality of virtualization systems including a first virtualization system adapted to run on a first core and a second virtualization system adapted to run on a second core, wherein the first virtualization system has a first characteristic with a first parameter and the second virtualization system has a second characteristic with a second parameter, wherein the parameter of the first characteristic and the parameter of the second characteristic are incompatible when implemented in a single virtualization system; and communication module for enabling the plurality of virtualization systems to communicate with each other.

15 Claims, 2 Drawing Sheets

(56) References Cited

FOREIGN PATENT DOCUMENTS

WO         2015103376 A1    7/2015
WO    WO2015103376    *   7/2015

OTHER PUBLICATIONS

Baumann, A. et. al., "The Multikernel: A New OS Architecture for Scalable Multicore Systems," Proceedings of the ACM SIGOPS 22nd Symposium on Operating Systems Principles, Oct. 11, 2009, pp. 29-44.
International Search Report for Application No. PCT/EP2017/083532, dated Apr. 10, 2018, 3 pp.

* cited by examiner

SYSTEM COMPRISING A PLURALITY OF VIRTUALIZATION SYSTEMS

CROSS-REFERENCE TO RELATED APPLICATIONS

This application claims benefit under 35 USC § 371 of PCT Application No. PCT/EP2017/083532 entitled SYSTEM COMPRISING A PLURALITY OF VIRTUALIZATION SYSTEMS, filed on Dec. 19, 2017 by inventor Michael Peter. PCT Application No. PCT/EP2017/083532 claims priority of European Patent Application No. 16 205 067.8, filed on Dec. 19, 2016.

FIELD OF THE INVENTION

The present invention concerns a system comprising: a processor with a plurality of cores having the same instruction set architecture, at least one memory connected to the processor, a plurality of virtualization systems adapted to run respectively on one core.

Further, the present invention relates to a method for operating a system comprising a processor with a plurality of cores having the same instruction set architecture, at least one memory connected to the processor, and communication module for enabling the plurality of virtualization systems to communicate with each other.

BACKGROUND OF THE INVENTION

When a processor comprising a plurality of cores is used with a hypervisor, the hypervisor simulates for a guest system the plurality of kernels. In this case, the different cores of the processor are transparent for the applications running in the guest system. The multiprocessor complexity is handled by the operating system.

According to other models, for example disclosed by Baumann et al. "*The multikernel: A new OS architecture for scalable multicore systems*" a system is disclosed, in which for each core of a multi-core architecture is provided with a kernel comprising specific CPU driver and for each processor a monitor running on the CPU driver which are in particular responsible for the inter process communication setup. For the communication between the kernels a shared memory is used. This system uses not virtualized guest systems. Further, it uses the same kernel on each core. Applications have to be specifically developed for these systems. Such a system treats a multi-core processor as a network of independent cores as if it were a distributed system.

Generally, functionality, performance, real-time behavior and correctness present conflicting development target. For example, real-time behavior may conflict with the need of functionality, so that different systems have to be used.

SUMMARY OF THE DESCRIPTION

An object of the invention is to provide a system and a method, which provides a flexibility and is adaptable to many use cases.

According to an aspect a system comprising: a processor with a plurality of cores having the same instruction set architecture, at least one memory connected to the processor, a plurality of virtualization systems adapted to run respectively on one core, the plurality of virtualization systems including a first virtualization system adapted to run on a first core and a second virtualization system adapted to run on a second core, wherein the first virtualization system has a first characteristic with a first parameter and the second virtualization system has a second characteristic with a second parameter, wherein the parameter of the first characteristic and the parameter of the second characteristic are incompatible when implemented in a single virtualization system; and communication module for enabling the plurality of virtualization systems to communicate with each other.

Further embodiments may include the following features in any feasible combination:

the first characteristic is the same as the second characteristic;

the plurality of virtualization systems includes a third virtualization system adapted to run on a third core, wherein the first and third virtualization system have the same parameter of the first characteristic, wherein, in particular, the first and third virtualization system are two instances of the same virtualization system;

at least one of the first and second characteristic is selected from the following characteristics:
  the memory size for executing virtualization system, and in particular one or more guest systems running on that virtualization system;
  whether the virtualization system supports an address space of 32-bit registers or an address space of 64-bit registers;
  support of a paravirtualization;
  support of full virtualization;
  number of guest systems supported by the virtualization system; and
  whether the virtualization system uses a 2 or 3-tier architecture;
  whether the virtualization system has real-time capabilities;
  whether the virtualization system has monitoring capabilities;
  support of runtime assignment of memory areas;
  whether the virtualization system resides in a protected execution environment;
  the system comprises at least 2, 3, 4, 5, 6, or more cores;
  the communication module includes a shared memory, wherein each virtualization system is adapted to read from and write to the shared memory;
  the communication module includes a plurality of message queues, in particular unidirectional message queues, which each transfer a message from one of the virtualization systems to another one of the virtualization systems;
  the system further comprises a plurality of guest systems, wherein a first guest system runs on the first and/or third virtualization system and a second guest system runs on the second virtualization system;
  the memory includes a safety domain and a non-safety domain, wherein each virtualization system includes a memory validator adapted to control whether a memory area assigned to a guest system during runtime is in the safety domain or the non-safety domain of the at least one memory; and/or
  the second virtualization system is adapted to support a real time guest system.

According to a further aspect the present invention relates to a control unit, in particular for a vehicle, comprising a system according to an embodiment disclosed herein.

According to an aspect a method for operating a system comprising a processor with a plurality of cores having the same instruction set architecture, at least one memory connected to the processor, and communication module for enabling the plurality of virtualization systems to communicate with each other, the method comprising defining a parameter of a first characteristic of a first virtualization system running on a first core, defining a parameter of a second characteristic of a second virtualization system running on a second core, wherein the parameter of the first characteristic and the parameter of the second characteristic are incompatible when implemented in a single virtualization system.

Further embodiments may include the following features in any feasible combination:

the first characteristic is the same as the second characteristic;

the method further comprises defining a parameter of a first characteristic of a third virtualization system running on a third core, the parameter of the first characteristic of the third virtualization system is equal to the parameter of the first characteristic of the first virtualization system; and/or the method further comprises generating a second instance of the first virtualization system.

According to a further aspect, a computer program product is provided comprising commands for executing the method according an embodiment disclosed herein, when loaded and executed on a processor. According to an embodiment a computer program product may be a physical software product, for example a hard disc, a solid-state disc, a CD-ROM, a DVD, comprising the program.

According to other aspects, the present invention relates to non-volatile memory, for example a hard disc, a solid-state device, a CD-ROM, a DVD, including a program containing commands for executing the method according an embodiment disclosed herein, when loaded and executed on a processor.

Further advantages, features, aspects and details are evident from the dependent claims, the description and the drawings.

BRIEF DESCRIPTION OF THE DRAWINGS

So that the manner in which the above recited features of the present invention can be understood in detail, a more particular description of the invention, briefly summarized above, may be read by reference to embodiments. The accompanying drawings relate to embodiments of the invention and are described in the following.

DETAILED DESCRIPTION

Figure 1:
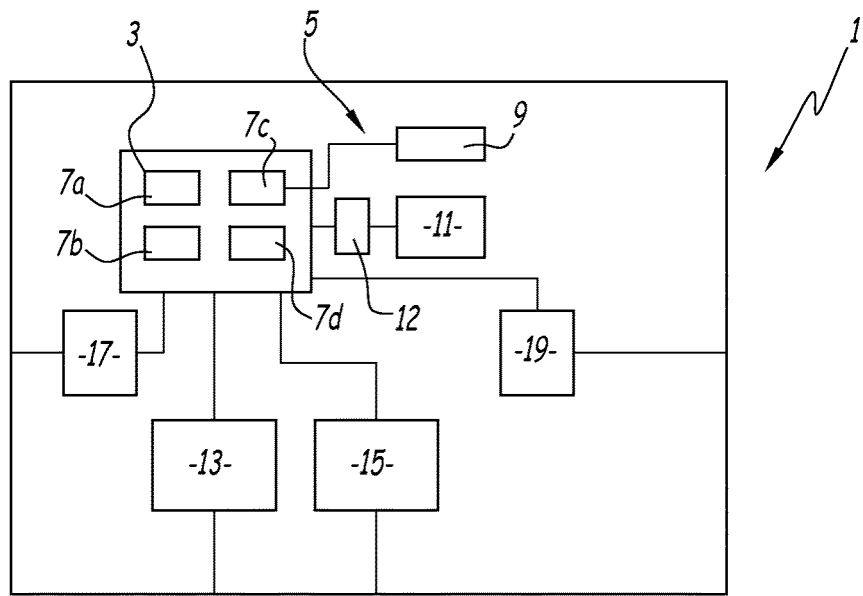
FIG. 1 shows schematically the hardware of an electronic control unit (ECU) in accordance with an embodiment of the present invention.

FIG. 1 shows schematically an electronic control unit (ECU) 1. The ECU 1 might be also called control unit in the present patent application. For example, the ECU 1 is realized as a system on chip (SoC). According to an embodiment, an ECU comprises one or more processors 3 connected to one or more memories 5. The or each processor 3 includes a plurality of cores 7a, 7b, 7c, 7d. For example, the processor 3 comprises at least 3, 4, 5, 6, 7, 8 or more cores. Typically, each core 7a-7d is an independent processing unit, independent from the other cores 7a-7d. The cores 7a-7d enable parallel computing in the processor 3.

According to an embodiment, the at least one processor 3 is a homogeneous multi-core system. In other words, the instruction set architecture of the cores 7a-7d of each processor 3 are identical. In an embodiment, the cores 7a-7d of each processor 3 are identical. The instruction set architecture includes a specification of a machine language and the native commands implemented by a particular core. In other words, the instruction set architecture is the interface between the software and the hardware, i.e. the cores.

The at least one memory 5 includes a static memory 9, for example a static random-access memory, and a dynamic memory 11, for example a dynamic random-access memory. The dynamic memory is dynamically refreshed. In contrast, static memory does not a periodical refreshing to avoid data loss. The static memory 9 retains data as long it is powered. Generally, the static memory 9 is faster than the dynamic memory 11. Typically, the static memory 9 is more expensive than dynamic memory 11, so that in some cases the capacity of dynamic memory 11 is at least 10 times greater than the capacity of static memory 9. In some embodiments, the dynamic memory is provided with a cache 12, which is invisible for the processor as it does not have an own address space. For example, the cache automatically loads data from the dynamic memory 11. The cache, as it might be invisible for the processor, is not controllable by the at least one processor 3, in particular by virtual guest systems.

According to embodiments, the static memory has a size of 300 to 500 Kbyte. The static memory can be accessed directly; i.e., not via an intermediate cache. This makes the static memory well-suited for real-time applications.

In some embodiments, the memory 5 is integrated in the processor 3.

Further, the ECU 1 may comprise interface for connecting to one or more bus systems, for example one or more hardware controllers 13 for controller area network (CAN) busses and/or one or more hardware controllers 15 for FlexRay busses. The ECU may also comprise further hardware controller for connecting to one or more wired or wireless connecting means, for example a Bluetooth connection, an Ethernet connection and/or to a USB (Universal Serial Bus) connecting means.

Usually, an automotive vehicle comprises a plurality of electronic control units (ECU), which may be assigned to different units of the vehicle, for example the steering wheel, the brakes, the windows, the motor, etc. For example, the ECU may be connected to some sensors or drivers via an interface 17, for example to drive the window, or to sense the angulation of the steering wheel, the level of oil or water in the motor. These ECUs may be connected to one or more displays via one or more display ports 19.

Further, to ECU may be connected to an input device, for example a keyboard, one or more buttons, or the like.

According to an embodiment, the ECU 1 is provided as an embedded system in a vehicle. The present invention may also relate to a standard computer.

Figure 2:
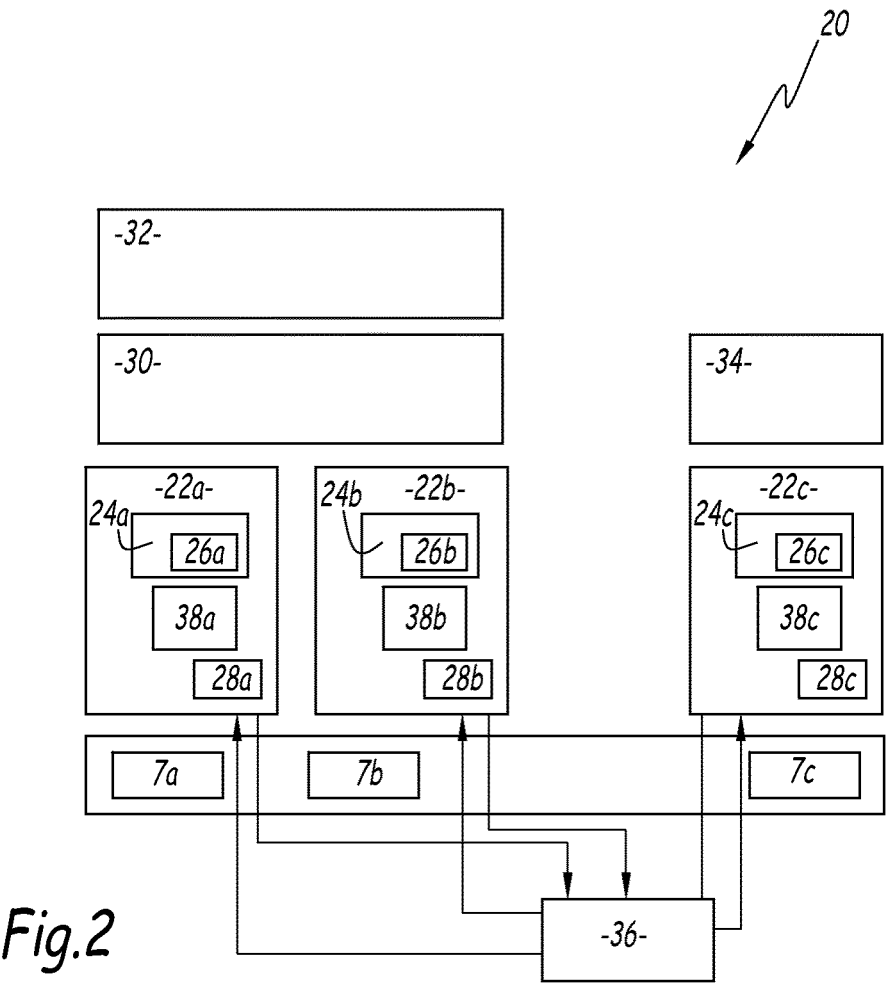
FIG. 2 shows schematically a portion of a system, in accordance with an embodiment of the invention.

FIG. 2 shows schematically a portion of a system 20 according to an embodiment. The system 20 includes one virtualization system 22a, 22b, 22c for each core 7a, 7b, 7c. In other words, each virtualization system 22a, 22b, 22c is assigned to a specific core. Each core 7a, 7b, 7c represents a CPU core, for example core 7a represents CPU0, core 7b represents CPU1 and core 7c represents CPUn.

Each virtualization system 22a, 22b, 22c creates a virtualization object 24a, 24b, 24c including a respective virtual CPU0 26a, virtual CPU1 26b and virtual CPUn 26c. For each guest system a respective virtual CPU is created, as it will be created later below. Only respective one virtual CPU is for the virtualization systems 22a and 22b is shown in FIG. 2. However, each virtualization system 22a, 22b may also contain for each guest system a respective virtual CPU.

According to an embodiment, each virtualization system 22a, 22b, 22c includes a respective memory validator 28a, 28b, 28c.

Further, the system 20 includes guest systems 30, 32, 34. The number of guest systems assigned to each virtualization system 22a, 22b, 22c is not fixed. For example, more than two guest systems or only one guest system may be assigned to virtualization systems 22a, 22b. Thus, each of the virtualization layers 22a, 22b includes two virtual CPUs 26a, 26b. Accordingly, two or more guest systems may be assigned to virtualization system 22c.

The guest systems 30, 32 are multiprocessor guest systems that are able to run on processors with multiple cores. Thus, each guest system 30, 32 is running on the first and second virtual processors 26a, 26b. However, it is also possible that a first guest system runs only on the first virtual processor 26a and a second guest system runs on the first and second virtual processor 26a, 26b.

According to an embodiment, in case a guest system 30, 32 runs on two virtual processors 26a, 26b, the virtualization system 22a, 22b on the respective processors are two instances of the same virtualization system. For example, virtualization systems 22a and 22b are two instances of the same virtualization system. In some embodiments, the virtualization systems 22a and 22b are coupled. When they are coupled, they may switch between the guest systems concurrently or at the same time. In other embodiments, even more than two virtualization systems may be coupled. The coupling of a plurality of virtualization systems 22a, 22b enable a synchronization of a context switch.

Two instances of the same virtualization system 22a, 22b may be also used in case each virtualization provides a platform for different guest systems. For example, virtualization system 22a may support another guest system than the virtualization system 22b.

A third guest system 34 is a single processor guest system that runs on the third virtual CPUn 26c.

One example of a virtualization system 22a, 22b, 22c is a hypervisor between the respective core 7a, 7b, 7c and the guest systems 30, 32, 34. The hypervisors run directly on the hardware, in particular respectively on one core 7a, 7b, 7c, to control the hardware and manages the guest systems 30, 32, 34. The hypervisor provides and defines a simulated hardware, in particular timer, interrupt controller, memory and/or a processor (CPU), for guest systems installed. Further, the hypervisor assigns the hardware resources to the respective guest systems, as it will be explained later.

According to some embodiments, the cores of the at least one processor 3 include or support a plurality of processor privilege levels. In some disclosures this might be also called protection rings. Each level has specific rights to access the resources. This enables the misuse of the resources. According to an embodiment, the processor 3, in particular the cores 7a, 7b, 7c and 7d, have two or three processor privilege levels.

In case of usage of three processor privilege levels of a respective core (also called three stage virtualization or 3-tier architecture), the virtualization system has the highest processor privilege level, the partitions and the operating systems or guest systems running in the partitions have the second processor privilege level, and the applications running on the operating systems or guest systems in the partitions have the lowest processor privilege level. The highest processor privilege level allows the most extensive access to the resources of the processor and/or the cores.

In such a case, in some embodiments, a hardware or hardware assisted virtualization is used. In case of a hardware virtualization, the registers for storing the status of the guest system and/or the applications running on the guest systems are hardware registers.

According to an embodiment, in the ARM v7 architecture, the processor privilege level PL0 is the least-privileged level, the second processor privilege level PL1 is the medium privileged level and the third processor privilege level PL2 is the most privileged, for example virtualization system, level.

In other embodiments, two processor privilege levels of the processor or core are used (also called two stage virtualization or 2 tier architecture). Then, an operating system (guest system) running in a partition and the applications running on the operating system or guest system are running in the same processor privilege level, and the virtualization system is running with a higher processor privilege level.

According to some embodiments, the switching between guest systems in a system using two processor privilege levels is faster than switching between guest systems in a system using three processor privilege levels. This is because the switch between two guest systems depends on the number of control registers that need to be saved and restored. In a two-processor-privilege-level system the registers of the highest processor privilege level need to be considered, whereas in a three-processor-privilege-level, the control registers of the two highest processor privilege levels need to be switched. For example, in the case of two processor privilege levels, the registers for storing the status of the guest systems and/or the applications are realized as virtualized control registers in the virtualization system. In other words, the virtualized or para-virtualized control registers do not need to be read and/or written to/from hardware registers as this would be the case in a 3-tier architecture.

Further, according to some embodiments, the virtualization layer is adapted to provide paravirtualization. In paravirtualization the software interface to the guest systems is not identical to that of the underlying hardware in contrast to a full virtualization. Thus, the para-virtualized guest systems usually need an adapted interface for the paravirtualization. In a full virtualization a complete instruction set architecture of a processor is simulated by the virtualization system. Para-virtualization is often used in two-processor-privilege-level systems.

According to some embodiments, a lightweight guest system may be used as a guest system. A lightweight guest system is adapted to use, according to an embodiment, only two processor privilege levels of the processor and paravirtualization. In other embodiments, which may be combined with embodiments disclosed herein, a light-weight guest system may use a tasks model, which comprises a scheduler for running a single application. In other words, the task module is not an operating system adapted for starting and stopping a plurality of applications. This embodiment may or may not be combined with paravirtualization.

As described here-above, each virtualization system includes a memory validator 28a, 28b, 28c. Each memory validator 28a, 28b, 28c is adapted to control the access of the guest systems to the one or more memories 5. For that purpose, when each memory validator 28a, 28b, 28c is started, the address range of a safety domain and/or a non-safety domain is also loaded. In other words, each memory validator 28a, 28b, 28c knows the address ranges of the safety domain and/or the non-safety domain. For example, the memory validator stores the start address and the end address of the safety domain and/or the non-safety domain. This may be also called memory ranges of the safety domain and/or the non-safety domain here-below.

For example, each virtualization system 22a, 22b, 22c or core 7a, 7b, 7c is assigned to a specific memory area in the one or more memories 5 to avoid conflicts. The assignment to a specific memory area is stored in a memory assignment storage, for example also called page table. The page table is a data structure to store a mapping between virtual addresses and physical addresses. For example, each virtualization system is adapted to modify a page table during runtime.

According to embodiments, the memory validator 28a, 28b, 28c validates changes of the memory attribution performed by the respective virtualization system 22a, 22b, 22c, in particular regarding their correctness. Changes of the memory attribution are for example page table updates. When a guest system is executed, the processor uses then these data structures, in particular the memory assignment storage. The respective memory validator 28a, 28b, 28c validates changes in the memory attribution, in particular the page table, on the respective core after each update of the memory attribution.

According to embodiments, the memory validator 28a, 28b, 28c checks whether the amended memory attribution remains in the correct domain; i.e. the safety domain and/or the non-safety domain. In particular, in some embodiment, each memory validator 28a, 28b, 28c, does not check further details of the new memory attribution.

Some embodiments that do not allow memory reconfiguration do not need a memory validator 28a, 28b, 28c.

Figure 3:
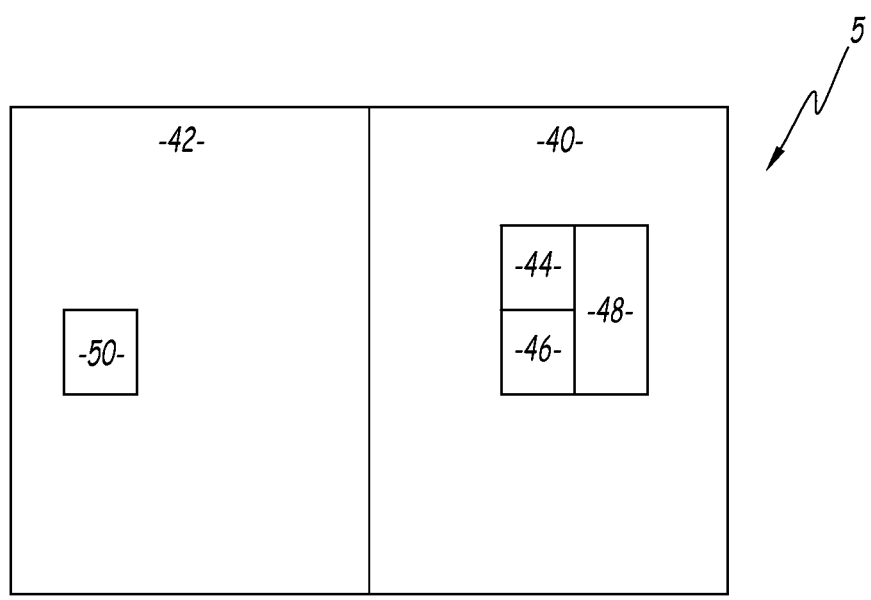
FIG. 3 shows schematically a portion of the memory 5, in accordance with an embodiment of the present invention.

FIG. 3 shows a portion of the memory 5. The at least one memory 5 includes a non-safety domain 40 and a safety domain 42. The non-safety domain 40 and the safety domain 42 are delimited by a specific address range.

According to embodiments, the guest systems are categorized into safety-critical and non-safety critical guest systems. Accordingly, the guest systems are assigned to the respective non-safety domain 40 and the safety domain 42.

In the non-safety domain 40, the assignment of memory ranges or areas to the respective guest systems 30, 32 is changed during runtime or dynamically assigned during runtime. For example, the memory area 44 is assigned to the guest system 30, the memory area 46, is assigned to the guest system 32. The assignment of the memory area 48 is switched between the guest system 30 and the guest system 32 dynamically, that means during runtime. The number of memory areas 44, 46 and 48 is not fixed to three. The number of memory areas 44, 46, 48 may be more than three or even less than three. The memory areas 44, 46 and 48 may be also called memory object.

In contrast, in the safety domain 42, the memory space is not changed during runtime. In other words, a specific memory area 50 is always assigned to the guest system 34.

The memory areas 44, 46, 48 and 50 may be also called memory object. In some embodiments, since the validator only enforces isolation between domains, guest systems of different criticality, that means safety critical systems and non-safety critical systems, do not use memory areas or memory objects 44, 46, 48, 50 in the same domain 40, 42.

In case a virtualization system 22a, 22b, 22c updates the assignment of memory areas 44, 46, 48, 50, for example in page tables, the memory validator 28a, 28b, 28c determines whether the memory area to be accessed in the non-safety domain 40 remains within the non-safety domain and does not interfere into the safety domain. For example, the memory validator 28a and/or 28b check whether the modifications in the assignment of the memory area 48 would affect the safety domain 42, in particular whether it would affect the memory area 50, by comparing the memory areas, in particular stored in the page tables, with the stored memory ranges of the safety domain and/or the non-safety domain. If this is not the case, the memory validator 28a, 28b, 28c is adapted to reject the request of the virtualization system 30, 32. According to some embodiments, the memory validator 28a, 28b, 28c only controls the result of the assignment memory areas of the at least one memory 5. According to some examples, the memory validator 28a, 28b, 28c is not adapted to assign the memory to the guest systems 30, 32, 34.

According to an embodiment, the system 20 further includes a communication module 36. For example, the communication module 36 is a shared memory. The communication module 36 may be located in the processor 3, for example. In other embodiments, the communication module 36 is located outside the processor 3. The communication module 36 includes message queues, in particular unidirectional message queues, which transfer a message from a one (originator) virtualization system 22a, 22b, 22c to another (destination) virtualization system 22a, 22b, 22c.

For example, the communication module provides a first message queue for the messages transferred from the first virtualization system 22a to the second virtualization system 22b, a second message queue for the messages transferred from the second virtualization system 22b to the first virtualization system 22a, a third message queue for the messages transferred from the first virtualization system 22a to the third virtualization system 22c, a fourth message queue for the messages transferred from the third virtualization system 22c to the first virtualization system 22a, a fifth message queue for the messages transferred from the second virtualization system 22b to the third virtualization system 22c, a sixth message queue for the messages transferred from the third virtualization system 22c to the second virtualization system 22b, and so on.

According to embodiments, each message queue is not read by multiple destination virtualization systems 22a, 22b, 22c, and/or each message queue is not written by more than one (originator) virtualization system 22a, 22b, 22c.

For example, the virtualization systems 22a, 22b, 22c write a message into a respective message queue that is subsequently read from the destination virtualization system 22a, 22b, 22c.

According to an embodiment, the destination virtualization system 22a, 22b, 22c is informed with an interrupt generated by the sending or originator virtualization system that a message has been written in the respective message queue. In another embodiment, for example if the destination virtualization system 22a, 22b, 22c is a real time virtualization system, the virtualization system 22a, 22b, 22c reads in regular time spaces the message queues whether a new message has arrived.

According to some embodiments, in case a message queue is completely occupied, the sending or originator virtualization system 22a, 22b, 22c is informed in case the message queue can accept a new message again. For example, the receiving virtualization system notifies a sender, when it retrieves a message from a full queue, so that a new empty spot is created. For example, an interrupt is used for informing the sending virtualization system. A real time (operating) guest system, applications or virtualization systems enable the processing of data in real time. For example, a real time (operating) guest system, applications or virtualization systems have predefined or guaranteed response times. According to an embodiment, they may have predictable response times and behavior, in particular for the scheduling and the memory management.

Each virtualization system 22a, 22b, 22c further includes a scheduler 38a, 38b, 38c. The scheduler 38a, 38b, 38c schedules the scheduling objects, for example the respective guest systems 30, 32, 34.

A scheduler 38a, 38b, 38c knows the scheduling objects and their associated scheduling context or scheduling contexts. The scheduling context includes the type of scheduling for a specific scheduling object and a scheduling parameter. For example, the scheduling context defines whether a real time or a fair share scheduling is applied to the scheduling object. According to an embodiment a real time scheduling includes for example a periodical scheduling or a static or dynamic priority scheduling. The scheduling parameter defines the actual values, for example the part of the fair share scheduling, the period in case of periodical scheduling and the like.

According to embodiments, each virtualization system 22a, 22b, 22c has a plurality of characteristics.

For example, a first characteristic depends on the size of the virtualization system. In other words, the size of the virtualization system is the parameter of the first characteristic. For example, the parameter may define whether the size of the virtualization system, in particular including the guest system, is small enough to fit into the static memory 9. If the size of the virtualization system, in particular including the one or more guest systems is greater needs more memory than provided by the static memory, it uses the dynamic memory 11. In other words, if a fast reactivity of the virtualization system is needed, this may be incompatible with a large size of the virtualization system, in particular including the guest system. Thus, some parameters of the first characteristic are incompatible to each other. In some embodiments, the size limitation of the virtualization system also limits its functionality. For example, to limit size, a virtualization system may be designed to support only a single guest with a static memory configuration.

According to an embodiment a second characteristic is whether the virtualization system uses an address space of 32-bit registers or an address space of 64-bit registers. Thus, the parameter of the second characteristic defines the address space used. Typically, in embodiments a context switch; i.e., a switch from a first guest system to a second guest system is faster if only an address space of 32 bits is used. For example, usually in case of a usage of an address space of 64 bit registers the number of general-purpose registers is higher than for a usage of an address space of 32 bit so that a context switch for a virtualization system using an address space of 64-bit registers is slower than a context switch for a virtualization system using an address space of 32-bit registers.

An example of a parameter of a third characteristic is the number of registers usable for a context switch; i.e., used during the switch from a first guest system to a second guest system. The number of registers usable for a context switch may be also called guest system context size. For example, a first virtualization system is adapted to provide only a paravirtualization, whereas a second virtualization system is adapted to provide full virtualization and para virtualization. In other words, the second virtualization system is adapted to have operating systems having an own scheduler as guest systems whereas the first virtualization system is only adapted to run applications. Thus, the first virtualization system has a lower switch overhead compared to the second virtualization system. Further, the first virtualization system is more suitable for real time applications that the second virtualization system.

Further, the guest system context size is different for a 2-tier architecture and 3-tier architecture. For performance and minimal guest system changes, a three-processor-privilege-level system or 3-tier architecture is preferable. However, for a fast context switch, a two-processor-privilege-level system or 2-tier architecture is better. For example. in a case where the system comprises two sets of guest systems: the first set rarely switches, the second set switches very often. As such, the first set is best served with a system having three processor privilege levels, whereas the second set would perform better with a system having two processor privilege levels. It should be noted that a virtualization system, according to some embodiments, use only two processor privilege levels even if the underlying core supports three.

The advantage is particularly pronounced if the guest is limited to a single execution level, that is, it runs its applications at the same processor privilege level as guest kernel.

According to an embodiment, the parameter of a fourth characteristic defines the number of guest systems running on a virtualization system is fixed. For example, a virtualization system is only allowed to run one guest system. This may reduce the complexity of that virtualization system. For example, a virtualization system allowing only one guest system is not compatible with a virtualization system allowing two or more guest systems. A virtualization system that only supports a single guest and runs on a three-processor-privilege-level system (3-tier architecture) does not need to implement guest system switching. All the transitions between guest kernel and applications are handled by the hardware.

In some embodiments, another advantage of limiting the number of guests to one is that this guest is always active. In event of an interrupt, there is no need to switch to it from another guest, giving it a low event handling latency, which is a requirement for real-time applications.

According to embodiments, even more characteristics may be defined, in particular depending on the behavior (real time or not real time), dynamic memory management, logging/run-time analysis, security state, for example in ARM TrustZone, an architecture developed by ARM Ltd, scheduling schemes, and others.

According to embodiments, each virtualization system implements one or more of these characteristics. The parameters of the characteristics determine the behavior of the virtualization systems 22a, 22b, 22c, for example whether the virtualization system is dedicated for a complex guest operating system or whether real time behavior is possible.

According an embodiment, it is possible that one virtualization system, for example the first virtualization system 22a is implemented using a first parameter of a specific characteristic and the third virtualization system is implemented using a second parameter, incompatible with the first parameter of that specific characteristic.

For example, the size of the virtualization system and the respective guest system 30, 32 does not fit into the static memory (first parameter of the first characteristic), whereas the third virtualization system 22c including the guest system 34 is adapted to be executed in the static memory 9; i.e., it uses a second parameter of the first characteristic being not compatible with the first parameter of the first characteristic.

According to another example, the first virtualization system 22a uses an address space of 64 bits, a first parameter of the third characteristic, and the third virtualization system 22c uses an address space of 32 bits, a second parameter of the third characteristic.

A further characteristic defines where the virtualization layer may be executed. For example, the parameter of the second characteristic defines whether the virtualization layer is executed in a protected execution environment or not. A protected execution environment is a secure area of the core and guarantees that code and data loaded inside to be protected with respect to confidentiality and integrity. For example, in a protected execution environment, direct memory access from outside of the respective core and/or processor is inhibited.

According to an embodiment, a virtualization layer executed in the protected execution environment cannot provide a full virtualization, for example that the guest systems running on the virtualization layer is an operating system. An example of a protected execution environment is TrustZone in an ARM processor having an architecture developed by ARM Ltd. In other words, it is difficult to have a virtualization layer configured to run in a protected execution environment and also outside a protected execution environment.

In other words, the virtualization systems 22a and 22c have parameters of characteristics that exclude their running on the same core 7a, 7b, 7c of the processor 3. In other embodiments, a parameter of a first characteristic may be incompatible with a parameter of a second characteristic. For example, the number of registers usable for a context switch (parameter of the third characteristic) may be incompatible with the information, whether the virtualization system is executed in a protected execution environment), as a full virtualization may be not possible in the protected execution environment. According to embodiments, a virtualization in a protected system is not compatible with a 3-tier architecture.

Another characteristic may be the support of semi-dynamic memory models, for example, whether the guest system may use a non-safety domain of the at least one memory. According to some embodiments, the support of semi-dynamic memory models is incompatible with the non-support of semi-dynamic memory models. For example, the usage of the non-safety domain is a vector through which the virtualization system can be attacked. According to some embodiments, to mitigate that risk, the memory validator is used to limit the scope of an attack/malfunction to the domain the virtualization system is assigned to. However, the validator cannot isolate guest systems in the same memory domain, i.e. the non-safety domain or the safety domain. Further, according to another example, memory reconfigurations are complex, lengthy operations that have a negative effect on real-time properties, such that real time guest systems usually use the safety domain as explained above.

A further characteristic may be the support of the para-virtualization. For example, in some embodiments, the support of full virtualization is incompatible with the support of para-virtualization by the virtualization system.

A further example of a characteristic is the number of processor privilege levels used by the system. The virtualization system is in the highest processor privilege level. In some embodiments, the guest systems, in particular the operating systems of the guest systems (guest OS), is in the same processor privilege level as the applications or processes (hosted by the guest OS), for example in a two-stage virtualization or two-tier architecture. If a guest OS and guest user share a processor privilege level, in case of a two-tier architecture, the virtualization system provides additional services to ensure that the guest OS is protected from the applications or processes; for example, it manages different address spaces/contexts. In a three-tier architecture, that separation is taken care of by the hardware. For example, in some embodiments, the virtualization system is adapted to operate a system with a two-tier architecture, even though the core is adapted to support three processor privilege levels and could thus support a three-tier architecture. Furthermore, in an embodiment, the virtualization system is adapted not to switch between two-tier and three-tier architectures.

Another example of a characteristic is whether the virtualization system has real-time capabilities. For example, a real-time capability is incompatible with a semi-dynamic memory model, a plurality number of guest systems and/or a monitoring capability. For example, a memory reconfiguration in a virtualization system is complex, which leads to long code paths. Since preemption is highly undesirable (for complexity reasons), such long code paths lead to long event handling latencies, which is not desirable for real-time applications.

According to an embodiment, the support of monitoring capabilities by the virtualization layer is also a characteristic. For example, monitoring may be used for taking a memory snapshot.

Thus, on different virtualization systems guest systems with very different characteristics being independent from each other are provided.

The invention claimed is:

1. A system comprising:
a processor comprising a plurality of cores having a same instruction set architecture;
at least one memory connected to said processor;
a plurality of guest systems;
a plurality of virtualization systems, each virtualization system running on a separate corresponding one of said cores, each virtualization system being a respective hypervisor between the corresponding core and the guest system, and each hypervisor assigning hardware resources to respective guest systems, the plurality of virtualization systems comprising:
a first virtualization system adapted to run on a first core; and
a second virtualization system adapted to run on a second core, wherein the first virtualization system has a first characteristic with a first parameter and the second virtualization system has a second characteristic with a second parameter, and wherein the parameter of the first characteristic and the parameter of the second characteristic are incompatible when implemented in a single virtualization system; and
a communication module for enabling said plurality of virtualization systems to communicate with each other.

2. The system according to claim 1, wherein the first characteristic is the same as the second characteristic.

3. The system according to claim 1, wherein said plurality of virtualization systems comprises a third virtualization system adapted to run on a third core, wherein the first and third virtualization system have the same parameter of the first characteristic, and wherein, in particular, the first and third virtualization system are two instances of the same virtualization system.

4. The system according to claim 3, wherein a first guest system runs on said first and/or third virtualization system, and a second guest system runs on said second virtualization system.

5. The system according to claim 1, wherein at least one of the first and second characteristic is selected from the following characteristics:
- memory size for executing virtualization system, and in particular one or more guest systems running on that virtualization system;
- whether the virtualization system supports an address space of 32-bit registers or an address space of 64-bit registers;
- support of a para-virtualization;
- support of full virtualization;
- number of guest systems supported by the virtualization system;
- whether the virtualization system uses a 2 or 3-tier architecture;
- whether the virtualization system has real-time capabilities;
- whether the virtualization system has monitoring capabilities;
- support of runtime assignment of memory areas; and
- whether the virtualization system resides in a protected execution environment.

6. The system according to claim 1, wherein the system comprises at least two cores.

7. The system according to claim 1, wherein said communication module comprises a shared memory, and wherein each virtualization system is adapted to read from and write to the shared memory.

8. The system according to claim 1, wherein said communication module comprises a plurality of message queues, in particular unidirectional message queues, which each transfer a message from one of said virtualization systems to another one of said virtualization systems.

9. The system according to claim 1, wherein said at least one memory comprises a safety domain and a non-safety domain, wherein each said virtualization system comprises a memory validator adapted to control whether a memory area assigned to a guest system during runtime is in said safety domain or said non-safety domain of said at least one memory.

10. The system according to claim 1, wherein said second virtualization system is adapted to support a real time guest system.

11. A control unit, in particular for a vehicle, comprising:
- a processor comprising a plurality of cores, each core having a same instruction set architecture;
- at least one memory connected to said processor;
- a plurality of guest systems;
- a plurality of virtualization systems, each virtualization system running on a separate corresponding one of said cores, each virtualization system being a respective hypervisor between the corresponding core and the guest system, and each hypervisor assigning hardware resources to respective guest systems, the plurality of virtualization systems comprising:
  - a first virtualization system adapted to run on a first core; and
  - a second virtualization system adapted to run on a second core, wherein said first virtualization system has a first characteristic with a first parameter and said second virtualization system has a second characteristic with a second parameter, wherein the parameter of the first characteristic and the parameter of the second characteristic are incompatible when implemented in a single virtualization system; and
- a communication module for enabling said plurality of virtualization systems to communicate with each other.

12. A method for operating a system comprising a processor comprising a plurality of cores each core having a same instruction set architecture, at least one memory connected to the processor, a plurality of guest systems, and a communication module for enabling a plurality of virtualization systems to communicate with each other, each virtualization system being a respective hypervisor between a corresponding core and the guest systems, the method comprising:
- running each hypervisor on a separate corresponding core;
- assigning, by each hypervisor, hardware resources to respective guest systems;
- defining a parameter of a first characteristic of a first virtualization system running on a first core;
- defining a parameter of a second characteristic of a second virtualization system running on a second core, wherein the parameter of the first characteristic and the parameter of the second characteristic are incompatible when implemented in a single virtualization system; and
- enabling the plurality of virtualization systems to communicate with each other.

13. The method according to claim 12, wherein the first characteristic is the same as the second characteristic.

14. The method according to claim 12, further comprising defining a parameter of a first characteristic of a third virtualization system running on a third core, the parameter of the first characteristic of the third virtualization system being equal to the parameter of the first characteristic of the first virtualization system.

15. The method according to claim 12, further comprising generating a second instance of the first virtualization system.

* * * * *